No. 624,275. Patented May 2, 1899.
G. WANDERPEPEN, A. VAN BERCKELAER & C. BYL.
GAS GENERATOR.
(Application filed Feb. 23, 1898.)
(No Model.)
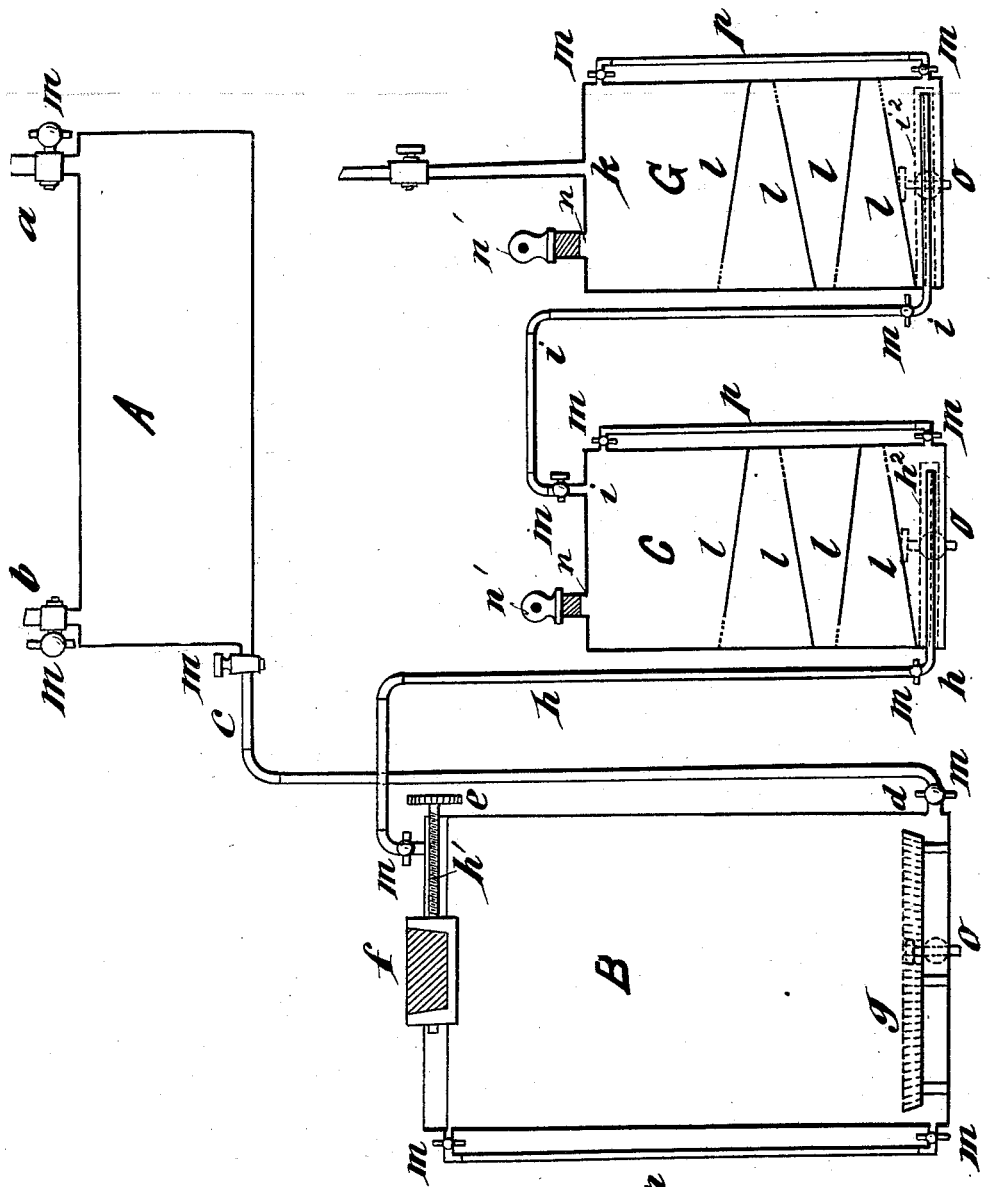
Witnesses:
G. S. Noble.
J. Buehler.
Inventors.
Georges Wanderpepen
Alexandre Van Berckelaer.
Camille Byl.
by B. Singer Att'y.

UNITED STATES PATENT OFFICE.

GEORGES WANDERPEPEN, ALEXANDRE VAN BERCKELAER, AND CAMILLE BYL, OF BRUSSELS, BELGIUM.

GAS-GENERATOR.

SPECIFICATION forming part of Letters Patent No. 624,275, dated May 2, 1899.

Application filed February 23, 1898. Serial No. 671,383. (No model.)

*To all whom it may concern:*

Be it known that we, GEORGES WANDERPEPEN, ALEXANDRE VAN BERCKELAER, and CAMILLE BYL, citizens of the Kingdom of Belgium, residing at Brussels, Belgium, have invented certain new and useful Improvements in Hydrogen-Gas Apparatus, of which the following is a specification.

The object of the present invention is an apparatus for producing gas having a great lighting power by the decomposition of water by means of the reaction of an acid on a metal and the subsequent carburization of the evolving gas by means of substances rich in carbon, such as naphtha, benzin, and the like.

The annexed drawing shows a form of construction of our apparatus in a vertical longitudinal section.

A indicates the acidulated-water tank; B, the gas-generator; C, the washer, and G the carbureter. The acidulated-water tank A is connected by means of the pipe $c$ with the generator B, the generator is connected with the washer C by means of the pipe $h$, and the washer C is connected with the carbureter G by means of the pipe $i$. The generator, washer, and carbureter are provided with level-indicators $p$ and the several pipes with cocks $m$. The tank A is fed with water and acid by means of the pipes $a$ $b$. The generator B is provided with a reaction-pan resting on feet at the bottom of the generator. This pan is perforated with numerous apertures and is intended to receive the metal—i. e., iron—which will cause the reaction by its contact with the acidulated water. At the top of the generator, in the lid closing the same, a screw $h'$, with hand-wheel $e$, is provided, bearing at its interior extremity a basket $f$, which can be reversed for feeding the pan.

The perforated pan $g$ has for its object to facilitate the contact between the metal and the acidulated water.

The washer C is provided with superposed oblique partitions $l$, having small openings in one side near the wall of the apparatus. These openings are so disposed as not to coincide with each other in the successive partitions. The carbureter G is provided with a similar arrangement of partitions. From the carbureter starts the pipe $k$, leading the gas to the burners or to the gasometer. The recipients B C G are provided with discharge-cocks O.

The working of the apparatus is as follows: The tank A is filled with water and acid by opening the cocks of the pipes $a$ and $b$. The proportion of water and acid is regulated by the degree of opening of each cock. The acidulated water is led to the generator by opening the cocks of the pipe $c$, which ends in the tubulure $d$ at the bottom of the generator B. The metal (iron waste or iron ores) stored in the basket $f$ is thrown into the pan $g$ by reversing said basket by means of the screw $h'$ with hand-wheel $e$. The hydrogen resulting from the decomposition of water escapes by the pipe $h$ and is led at the bottom of the washer C, containing pure water poured by the opening $n$ with screw-stopper $n'$. The end of the pipe $h$ inside the washer C is perforated with numerous openings and inclosed in a wire-cloth sheath $h^2$. The gas travels along the partitions $l$ and is freed from the particles of acid and impurities it may contain. It escapes by the pipe $i$ and is led at the bottom of the carbureter, which contains a body rich in carbon, preferably a hydrocarburet, such as benzin or naphtha. The extremity of the pipe $i$ inside the carbureter is also perforated and inclosed in a wire-cloth sheath $i^2$. The gas travels along the partitions $l$ and escapes in the form of carbureted hydrogen by the pipe $k$.

Having fully described our invention, what we claim, and desire to secure by Letters Patent, is—

In an apparatus for producing hydrogen gas, a washing-tank and a carbureter each provided with superposed obliquely-arranged partitions having alternately-disposed openings therein, a generator, and pipe connections between said generator, washer and carbureter respectively, the portions of said pipes within the washer and carbureter being perforated and covered with wire-cloth sheaths, substantially in the manner and for the purpose described.

GEORGES WANDERPEPEN.
        ALEXANDRE VAN BERCKELAER.
        CAMILLE BYL.

Witnesses:
    CAMILLE ROLLAND,
    AD. STURM.